(12) United States Patent
Wilson (10) Patent No.: US 8,015,722 B1
(45) Date of Patent: Sep. 13, 2011

(54) APPARATUS AND METHOD FOR MEASURING INTERNAL CLEARANCES

(75) Inventor: Bradley Edwin Wilson, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/782,145

(22) Filed: May 18, 2010

(51) Int. Cl.
*G01B 5/14* (2006.01)
(52) U.S. Cl. ............................................. 33/542; 33/810
(58) Field of Classification Search .............. 33/542, 33/792, 794, 795, 810
See application file for complete search history.

(56) References Cited

U.S. PATENT DOCUMENTS

| | | | |
|---|---|---|---|
| 4,288,924 A * | 9/1981 | Mizuno et al. ................. | 33/794 |
| 4,539,755 A | 9/1985 | Weimer | |
| 5,363,562 A | 11/1994 | Schmidt | |
| 5,629,479 A * | 5/1997 | Paulson .......................... | 33/794 |
| 6,886,267 B1 | 5/2005 | Karwowski et al. | |
| 7,228,639 B2 * | 6/2007 | Wilkinson et al. .............. | 33/542 |
| 7,415,779 B2 * | 8/2008 | St. Louis et al. ................ | 33/836 |
| 7,448,143 B2 * | 11/2008 | St. Louis et al. ................ | 33/836 |
| 2007/0271807 A1 * | 11/2007 | Karwowski ..................... | 33/828 |
| 2009/0064522 A1 * | 3/2009 | Herron et al. ................... | 33/655 |

* cited by examiner

*Primary Examiner* — Brad Bennett
(74) *Attorney, Agent, or Firm* — Dority & Manning, P.A.

(57) ABSTRACT

A device for measuring internal clearances includes a base having a base surface. A first leg in sliding engagement with the base includes a first leg surface and a first distal end. When the base surface abuts a component, a predetermined distance between the base surface and the first leg surface results in the first distal end being located in the clearance. A method for measuring a clearance includes inserting a leg of a device into a borehole and moving the device rearward until the device abuts the borehole. The method further includes withdrawing the leg from the borehole, extending the leg in the clearance, and measuring the distance that the leg was extended after being withdrawn.

30 Claims, 9 Drawing Sheets

APPARATUS AND METHOD FOR MEASURING INTERNAL CLEARANCES

FIELD OF THE INVENTION

The present invention relates generally to measuring internal clearances. Specifically, the present invention describes a device and method for measuring internal clearances, for example in a turbine, in which the clearance to be measured is not directly accessible.

BACKGROUND OF THE INVENTION

Large pieces of commercial equipment often have fixed components in close proximity with moving components. In a gas turbine, for example, a compressor includes multiple stages of rotating blades in close proximity with stationary vanes. Ambient air enters the compressor, and the rotating blades and stationary vanes progressively impart kinetic energy to the working fluid (air) to increase the pressure of the working fluid and bring it to a highly energized state. The compressed working fluid flows to one or more combustors which mix fuel with the compressed working fluid and ignite the mixture to produce combustion gases having a high temperature and pressure. The combustion gases flow through alternating stages of rotating blades or buckets and fixed blades or nozzles in the turbine. The rotating blades or buckets are attached to a rotor, and expansion of the combustion gases as they flow through the turbine stages cause the buckets, and thus the rotor, to rotate to produce work.

The clearance between the rotating and stationary components in the compressor and turbine is an important design and operational consideration that balances efficiency and performance on the one hand with manufacturing and maintenance costs on the other hand. For example, reducing the clearance between the buckets and the static shroud or casing in the turbine generally improves the efficiency and performance of the turbine by reducing the amount of combustion gases that bypass the turbine buckets. However, reduced clearances may also result in additional manufacturing costs to achieve the reduced clearances and increased maintenance costs attributed to increased rubbing, friction, or impact between the rotating and stationary components.

The clearances between rotating and stationary components are often checked during assembly and periodically after operations to ensure that the design clearances are maintained and the components are properly aligned. During assembly, the rotating and stationary components may be readily accessible to verify clearances. However, once assembled, the rotating and stationary components may not readily accessible. As a result, extended shutdown periods to allow for time-consuming disassembly of the components may be necessary to gain direct access to the clearances to be measured. Alternately, the clearances may be indirectly measured by measuring adjacent components. However, indirect measurement of the clearances introduces error in the measurements, and the introduced errors may be significant in comparison to the allowable or desired clearances. Therefore, a device for directly measuring clearances between rotating and stationary components in assembled equipment would be desirable.

BRIEF DESCRIPTION OF THE INVENTION

Aspects and advantages of the invention are set forth below in the following description, or may be obvious from the description, or may be learned through practice of the invention.

One embodiment of the present invention is a device for measuring a clearance between an inner portion of a turbine casing and an outer portion of a turbine bucket. The device includes a base having a base surface. A first leg in sliding engagement with the base includes a first leg surface and a first distal end. When the base surface abuts the turbine casing, a predetermined distance between the base surface and the first leg surface results in at least a portion of the first distal end of the first leg being located between the inner portion of the turbine easing and the outer portion of the turbine bucket.

An alternate embodiment of the present invention is a device for measuring a clearance between an inner portion of a turbine casing and an outer portion of a turbine bucket. The device includes a base having a base surface. A first leg in sliding engagement with the base includes a first leg surface and a first distal end. A second leg proximate to the base includes a second distal end. When the base surface abuts the turbine casing, a predetermined distance between the base surface and the first leg surface results in at least a portion of the first distal end of the first leg being located between the inner portion of the turbine casing and the outer portion of the turbine bucket and the second distal end of the second leg being approximately even with the inner portion of the turbine casing.

The present invention also includes a method for measuring a clearance between an inner portion of the turbine casing and an outer portion of a turbine bucket. The method includes inserting a leg of a device into a borehole in the turbine casing and moving the device rearward until the device abuts the borehole in the turbine casing. The method further includes withdrawing the leg of the device from the borehole until at least a portion of the leg abuts the inner portion of the turbine casing, extending the leg of the device inside the turbine casing until at least a portion of the leg abuts the outer portion of the turbine bucket, and measuring the distance that the leg was extended after being withdrawn.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying Figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
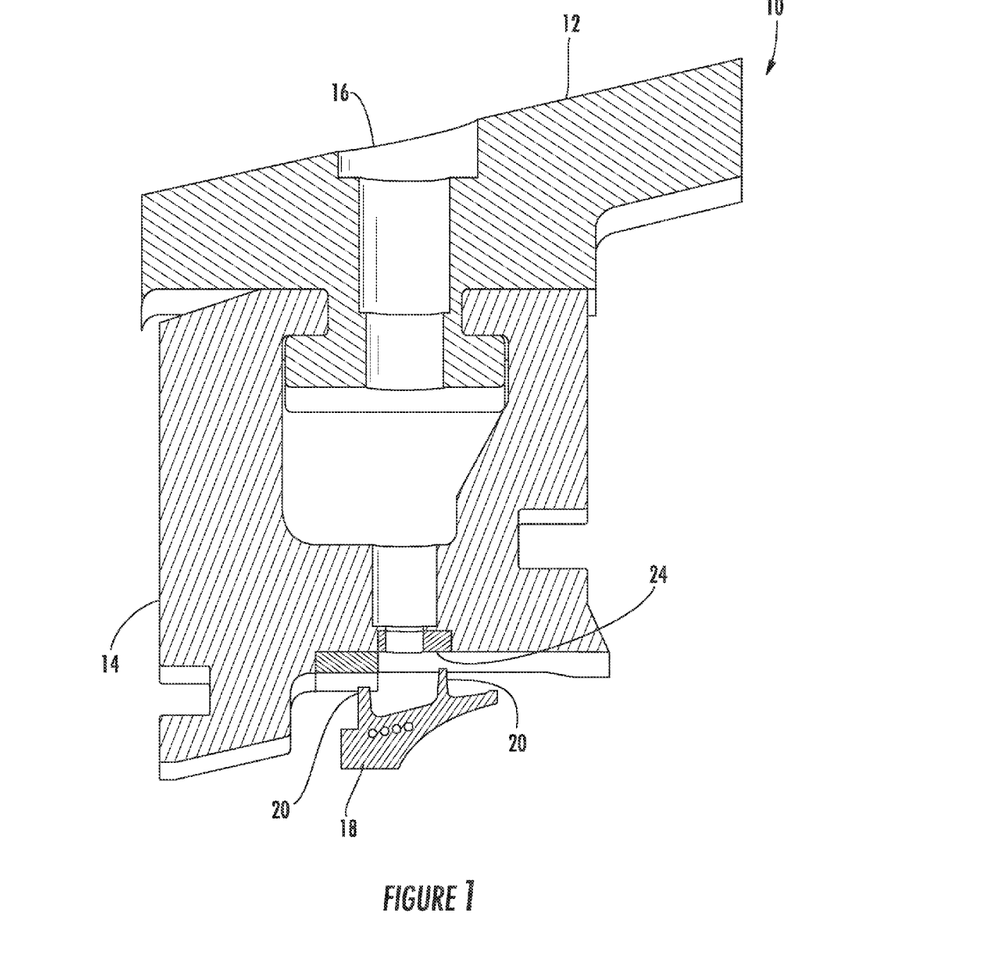
FIG. 1 is a simplified cross-section of an outer portion of a turbine stage.

FIG. 1 provides a simplified cross-section of an illustrative environment for various embodiments of the present invention. Although various embodiments of the present invention are illustrated in the context of a turbine stage, one of ordinary skill in the art should readily appreciate that the scope of the present invention is not limited to measuring clearances in a turbine stage and is properly defined by the structural limitations of the device recited in the claims. As shown in FIG. 1, an outer portion of a turbine stage typically includes a turbine casing 10 that surrounds the stage and contains the combustion gases as they flow through the turbine. The turbine casing 10 may be a single piece or unitary construction, or it may comprise an outer shell 12 surrounding an inner shell 14, as shown for example in FIG. 1. Boreholes 16 may be peripherally located around the turbine casing 10 to provide internal access to the turbine without requiring substantial disassembly.

Figure 2:
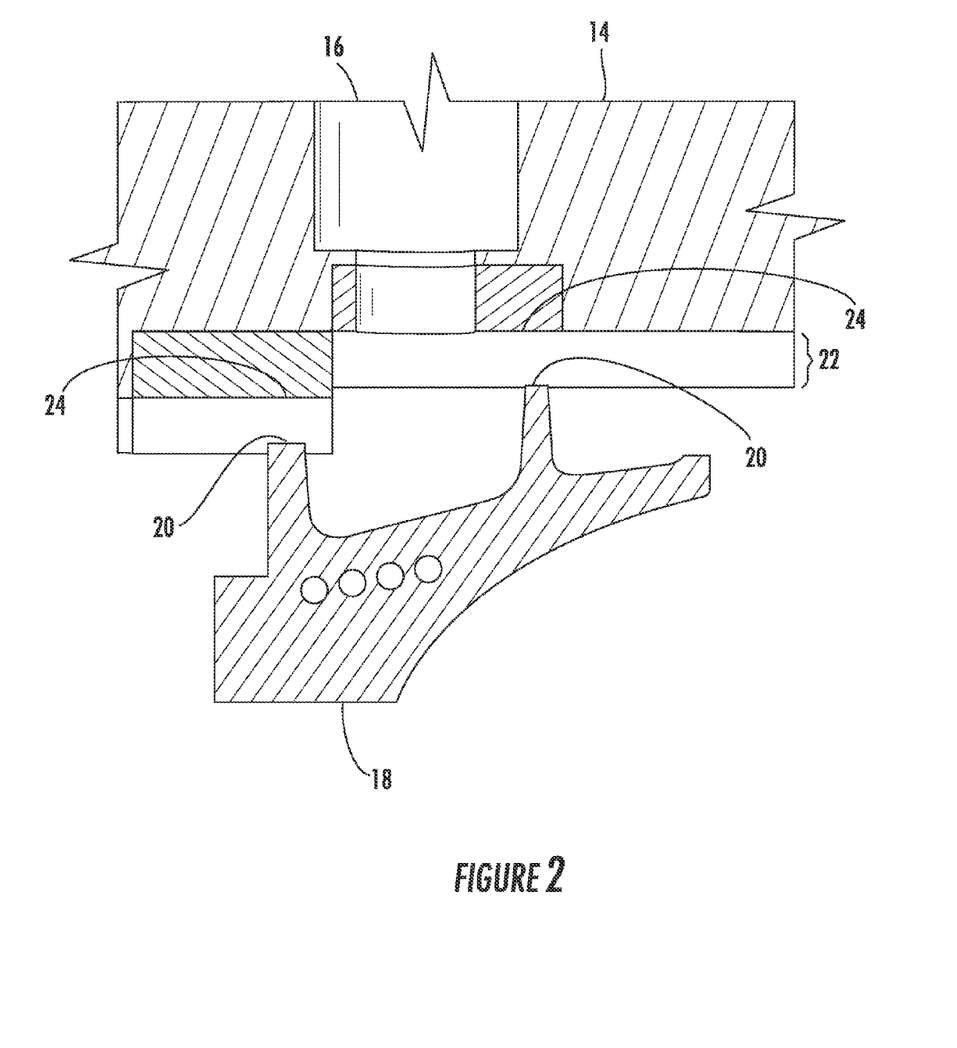
FIG. 2 is an enlarged view of a clearance between a shroud tip and an inner portion of a turbine casing.

Each turbine stage further includes a row of rotating blades or buckets 18. The outer portion of each bucket 18 may include one or more shroud tips 20. The shroud tips 20 extend radially from the buckets 18, producing a clearance 22 between the shroud tips 20 at the outer portion of the buckets 18 and an inner portion of the turbine casing 24, as more clearly illustrated in FIG. 2. As shown in FIGS. 1 and 2, the shroud tips 20 may not be axially aligned with the boreholes 16 that pass through the turbine casing 10. As a result, the clearance 22 between the shroud tips 20 at the outer portion of the buckets 18 and the inner portion of the turbine casing 24 may not be directly visible or observable through the boreholes 16, making direct measurement of the clearance 22 difficult without disassembly of the turbine casing 10.

Figure 3:
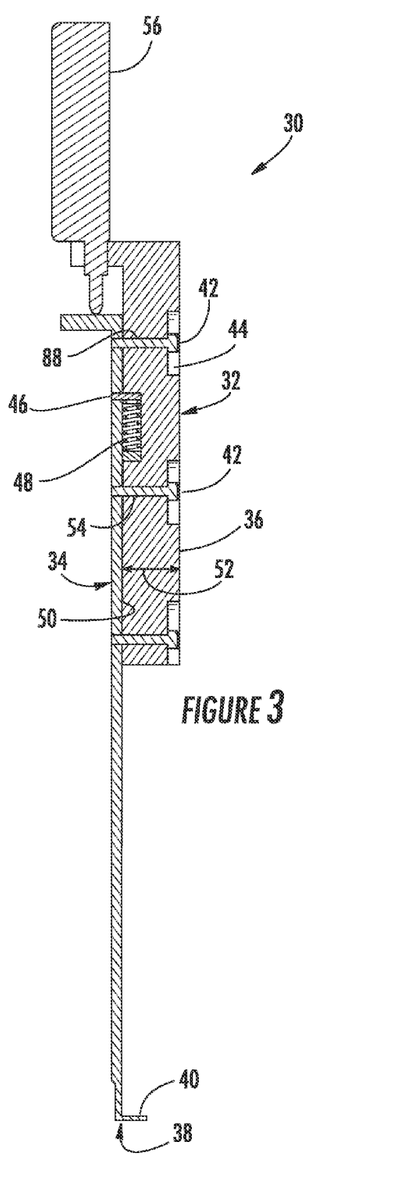
FIG. 3 is a side plan view of a measuring device according to one embodiment of the present invention.
Figure 4:
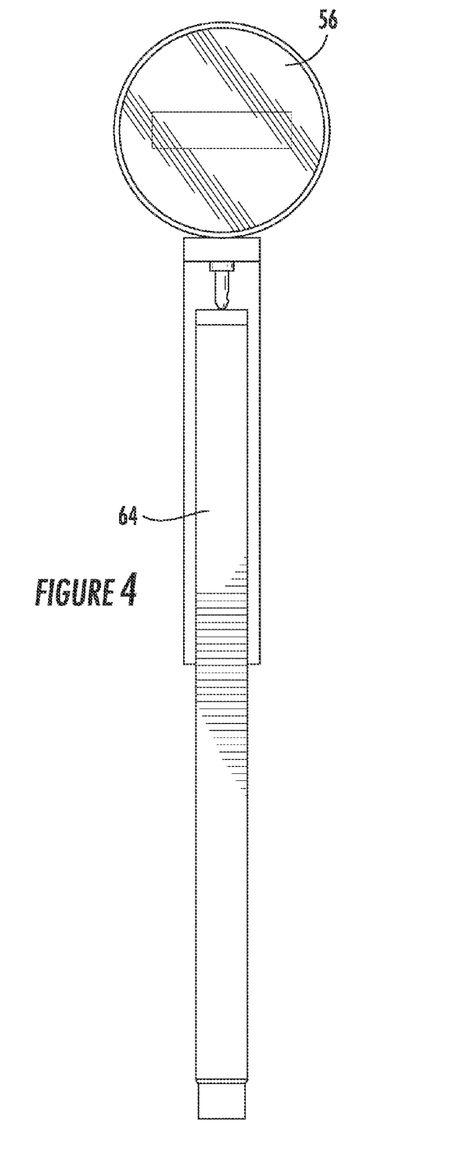
FIG. 4 is a front plan view of the measuring device shown in FIG. 3.

FIG. 3 is a side plan view and FIG. 4 is a front plan view of a measuring device 30 according to one embodiment of the present invention. As shown in FIGS. 3 and 4, the device 30 generally includes a base 32 and a first leg 34. The base 32 is sized according to the size of the boreholes 16 in the turbine casing 10. For example, the height of the base 32 may be 4 inches, 6 inches, 8 inches, or longer to accommodate corresponding borehole 16 sizes. The effective width or diameter of the base 32 may be sized to prevent the base 32, and thus the first leg 34, from extending too far into the turbine and contacting sensitive portions of the turbine bucket 18. In addition, the base 32 includes a base surface 36 which may be curved or shaped to provide a complementary fit with the boreholes 16.

The first leg 34 includes a first distal end 38, and in particular embodiments, the first leg 34 may include a first member 40 that extends substantially perpendicular from the first distal end 38 of the first leg 34. The first leg 34 may be in sliding engagement with the base 32. For example, as shown in FIGS. 3 and 4, pins 42 may connect the first leg 34 to the base 32, and slots 44 in the base 32 may allow the first leg 34 to slide with respect to the base 32. In alternate embodiments, a rail or other equivalent structure between the first leg 34 and the base 32 may be used to allow the first leg 34 to move with respect to the base 32. As a result of this sliding engagement between the first leg 34 and the base 32, the first distal end 38 of the first leg 34 may be extendable along and away from the base 32. The first leg 34 may also be biased in a particular direction with respect to the base 32. For example, as shown most clearly in FIG. 3, the first leg 34 may include a tab 46, and a spring 48 between the base 32 and the tab 46 may be used to bias the first leg 34 upward with respect to the base 32.

The first leg 34 further includes a first leg surface 50 on either side of the first leg 34. Although FIG. 3 arbitrarily indicates the first leg surface 50 on the right side of the first leg 34, such is not a limitation of the embodiments of the present invention unless specifically cited in the claims, and the first leg surface 50 may alternately comprise the left side of the first leg 34. The first leg surface 50 is a predetermined distance 52 from the base surface 36 so that when the base surface 36 abuts the turbine casing 10 at least a portion of the first distal end 38 of the first leg 34 (e.g., the first member 40, if present) is located between the inner portion of the turbine casing 24 and the shroud tip 20 at the outer portion of the turbine bucket 18. The predetermined distance 52 between the first leg surface 50 and the base surface 36 may be adjustable to accommodate specific geometries and dimensions of the clearance 22 being measured. For example, the diameter and depth of the boreholes 16, the thickness of the turbine casing 10, and/or the axial offset between the clearance 22 being measured and the corresponding borehole 16 are all examples of specific geometries and dimensions that may require adjustment of the predetermined distance 52 between the first leg surface 50 and the base surface 36 to ensure that at least a portion of the first distal end 38 of the first leg 34 is located between the inner portion of the turbine casing 24 and the shroud tip 20 at the outer portion of the turbine bucket 18 when the base surface 36 abuts the turbine casing 10. Various means may be used to adjust the predetermined distance 52. For example, the pins 42 previously described with respect to FIGS. 3 and 4 may be in a threaded engagement 54 between the base 32 and the first leg 34 so that rotation of the pins 42 in either direction alternately increases or decreases the predetermined distance 52 between the base 32 and the first leg 34. Other structures for adjusting the predetermined distance 52 between the base 32 and the first leg 34 may include, for example, clamps, screws, washers, and other equivalent structure known to one of ordinary skill in the art.

Figure 5:
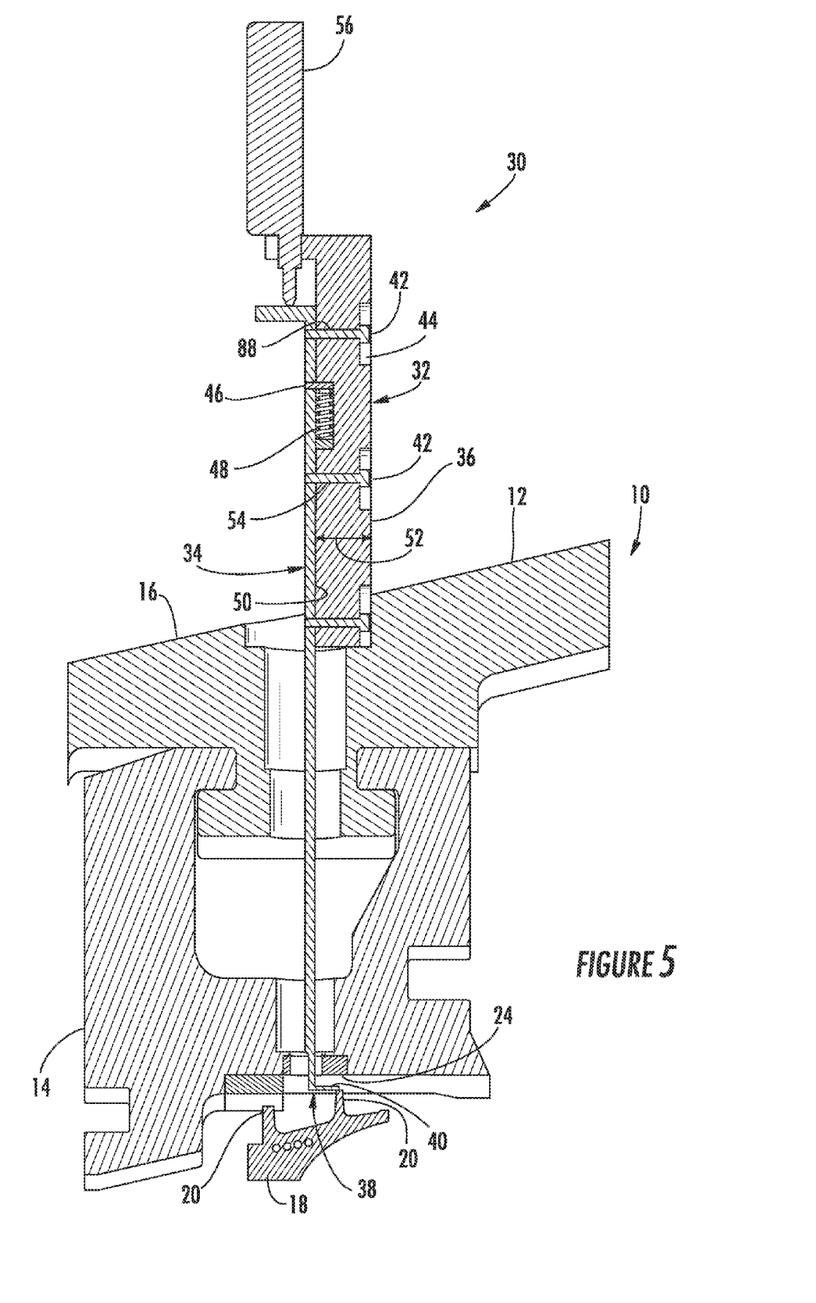
FIG. 5 is a simplified cross-section of the measuring device shown in FIGS. 3 and 4 inserted through a borehole in the turbine casing.
Figure 6:
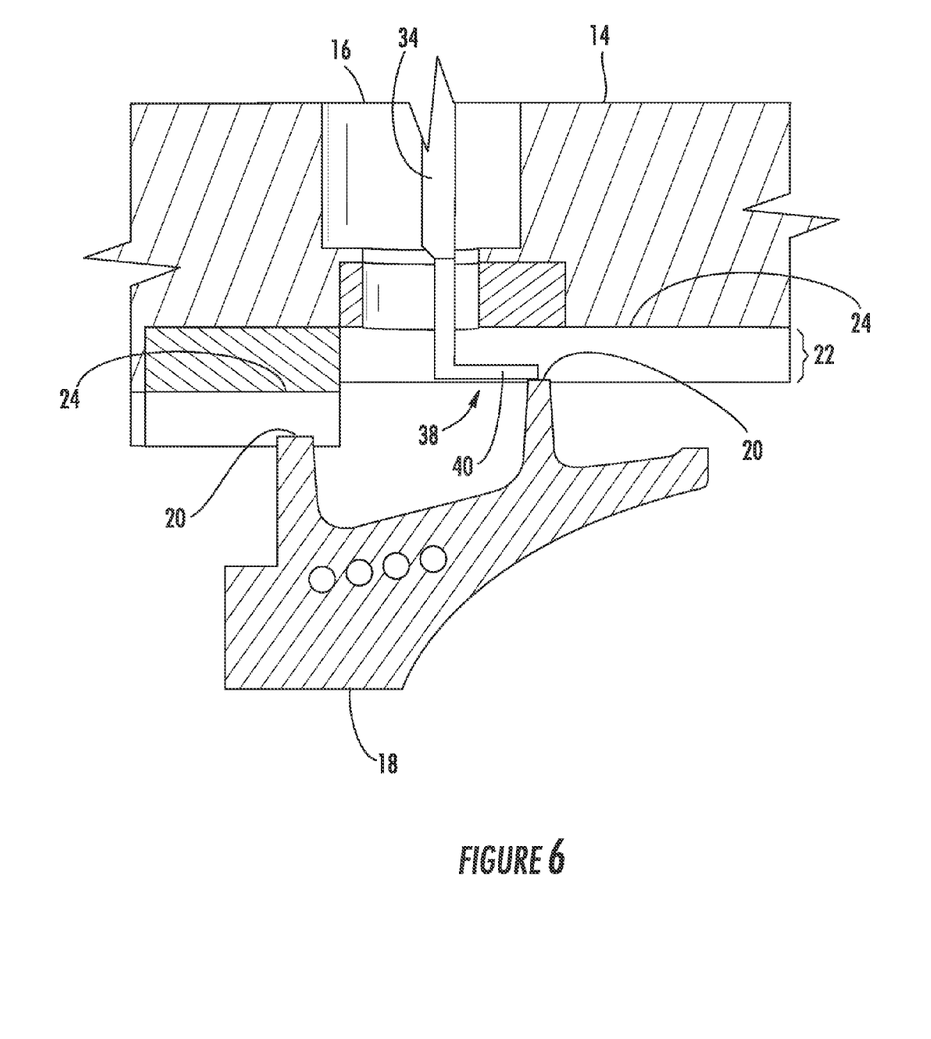
FIG. 6 is an enlarged view of the distal end of the measuring device shown in FIG. 5.

FIG. 5 provides a simplified cross-section of the measuring device 30 shown in FIGS. 3 and 4 inserted through the borehole 16 in the turbine casing 10. As shown in FIG. 5, the device 30 is illustrated measuring the internal clearance 22 between the inner portion of the casing 24 and the shroud tip 20 at the outer portion of the turbine bucket 18. To do so, the first leg 34 of the device 30 is inserted through the borehole 16 in the turbine casing 10, and the device 30 is moved rearward until the base surface 36 abuts or touches the turbine casing 10. In this position, the predetermined distance 52 between the base surface 36 and the first leg surface 50 ensures the proper positioning of at least a portion of the first distal end 38 in the clearance 22 between the inner turbine casing 24 and the shroud tip 20. Specifically, with the base surface 36 abutting or touching the turbine casing 10, the first distal end 38 of the first leg 34 extends through the borehole 16 until it is approximately even with the inner portion of the turbine casing 24 resulting in at least a portion of the first distal end 38 being located between the inner portion of the turbine casing 24 and shroud tip 20 at the outer portion of the turbine bucket 18. The first member 40, if present, would thus extend substantially perpendicular from the first distal end 38 along the inner surface of the casing 24. With at least a portion of the first distal end 38 of the first leg 34 between the inner portion of the turbine casing 24 and shroud tip 20 at the outer portion of the turbine bucket 18, the clearance 22 between the inner portion of the turbine casing 24 and the outer portion of the turbine bucket 18 may be measured by slightly withdrawing the device 30 from the borehole 16 or alternately sliding the first leg 34 with respect to the base 32 to ensure the first distal end 38 contacts the inner portion of the turbine casing 24. The first leg 34 may then be slid in the opposite direction along and away from the base 32 until the first distal end 38 contacts the shroud tip 20, as shown more clearly in FIG. 6. An indicator 56 may be connected to the first leg 34 to measure the distance traveled by the first leg 34, and thus the clearance 24 between the inner portion of the turbine casing 24 and shroud tip 20 at the outer portion of the turbine bucket 18.

Figure 7:
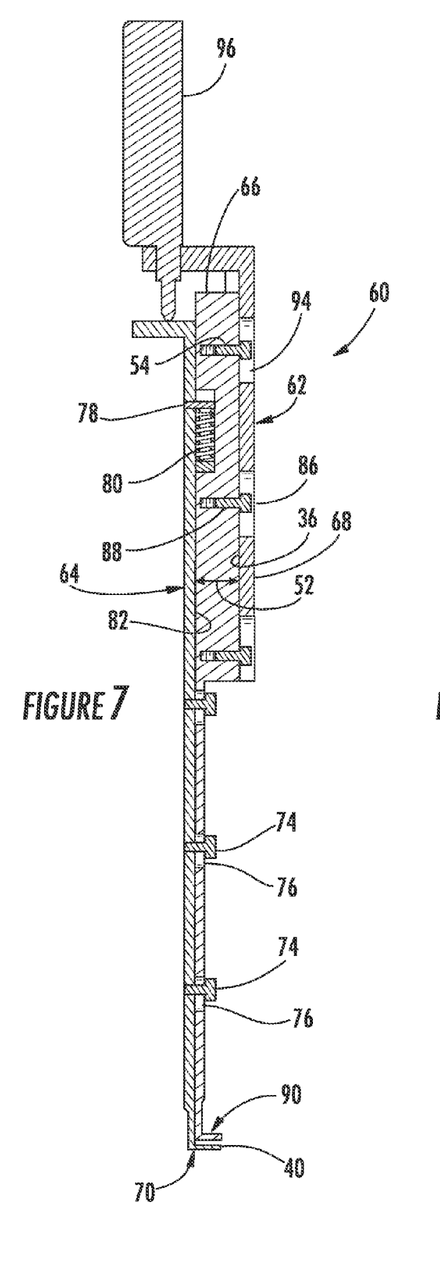
FIG. 7 is a side plan view of a measuring device according to an alternate embodiment of the present invention.
Figure 8:
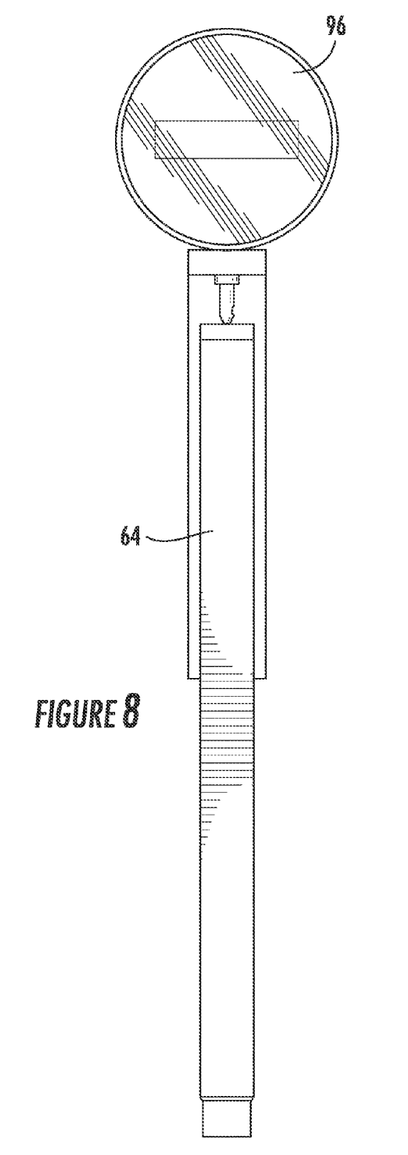
FIG. 8 is a front plan view of the measuring device shown in FIG. 7.

FIGS. 7 and 8 show a measuring device 60 according to an alternate embodiment of the present invention. In this embodiment, the device 60 generally includes a base 62, a first leg 64, and a second leg 66. The base 62 again is sized according to the size of the boreholes 16 in the turbine casing 10. For example, the height of the base 62 may be 4 inches, 6 inches, 8 inches, or longer to accommodate corresponding borehole 16 sizes. The effective width or diameter of the base 62 may be sized to prevent the base 62, and thus the first and second legs 64, 66, from extending too far into the turbine and contacting sensitive portions of the turbine bucket 18. In addition, the base 62 includes a base surface 68 which may be curved or shaped to provide a complementary fit with the boreholes 16 through the turbine casing 10.

The first leg 64 includes a first distal end 70, and in particular embodiments, the first leg 64 may include a first member 72 that extends substantially perpendicular from the first distal end 70 of the first leg 64. The first leg 64 is in sliding engagement with the base 62, either directly or indirectly through sliding engagement with the second leg 66. For example, as shown in FIGS. 7 and 8, pins 74 may connect the first leg 64 to the second leg 66, and slots 76 in the second leg 66 may allow the first leg 64 to slide with respect to the second leg 66, and thus the base 62. In alternate embodiments, a rail or other equivalent structure between the first leg 64 and the second leg 66 may be used to allow the first leg 64 to move with respect to the second leg 66 and the base 62. The first leg 64 may be biased in a particular direction with respect to the base 62. For example, as shown most clearly in FIG. 7, the first leg 64 may include a tab 78, and a spring 80 between the second leg 66 and the tab 78 may be used to bias the first leg 64 upward with respect to the base 62. As a result of this sliding engagement between the first leg 64 and the second leg 66 and base 62, the first distal end 70 of the first leg 64 may be extendable along and away from the base 62.

The first leg 64 further includes a first leg surface 82 on either side of the first leg 64. Although FIG. 7 arbitrarily indicates the first leg surface 82 on the right side of the first leg 64, such is not a limitation of the embodiments of the present invention unless specifically cited in the claims, and the first leg surface 50 may alternately comprise the left side of the first leg 34. The first leg surface 82 is a predetermined distance 84 from the base surface 68 so that when the base surface 68 abuts the turbine casing 10 at least a portion of the first distal end 70 of the first leg 64 (e.g., the first member 72, if present) is located between the inner portion of the turbine casing 24 and the shroud tip 20 at the outer portion of the turbine bucket 18. The predetermined distance 84 between the first leg surface 82 and the base surface 68 may be adjustable to accommodate specific geometries and dimensions of the clearance 22 being measured. For example, the diameter and depth of the borehole 16, the thickness of the turbine casing 10, and/or the axial offset between the clearance 22 being measured and the corresponding borehole 16 are all examples of specific geometries and dimensions that may require adjustment of the predetermined distance 84 between the first leg surface 82 and the base surface 68 to ensure that at least a portion of the first distal end 70 of the first leg 64 is located between the inner portion of the turbine casing 24 and the shroud tip 20 at the outer portion of the turbine bucket 18 when the base surface 68 abuts the turbine casing 10. Various means may be used to adjust the predetermined distance 84. For example, screws 86 may provide a threaded engagement 88 between the base 62 and the first leg 64 and/or the second leg 66 so that rotation of the screws 86 in either direction alternately increases or decreases the predetermined distance 84 between the base 62 and the first leg 64. Other structures for adjusting the predetermined distance 84 between the base 62 and the first leg 64 may include, for example, clamps, screws, washers, and other equivalent structure known to one of ordinary skill in the art.

The second leg 66 includes a second distal end 90, and in particular embodiments, the second leg 66 may include a second member 92 that extends substantially perpendicular from the second distal end 90 of the second leg 66. The second leg 66 is generally proximate the base 62 and may be in sliding engagement with the base 62. For example, as shown in FIGS. 7 and 8, the previously described screws 86 may connect the second leg 66 to the base 62, and slots 94 in the base 62 may allow the second leg 66 to slide with respect to the base 62. In alternate embodiments, a rail or other equivalent structure between the second leg 66 and the base 62 may be used to allow the second leg 66 to move with respect to the base 62. As a result of this sliding engagement between the second leg 66 and the base 62, the second distal end 90 of the second leg 66 may be extendable along and away from the base 62. In this manner, the second leg 66 may be adjusted to vary the distance between the second distal end 90 and the base 62 to allow the device 60 to be used to measure components having different dimensions.

Figure 9:
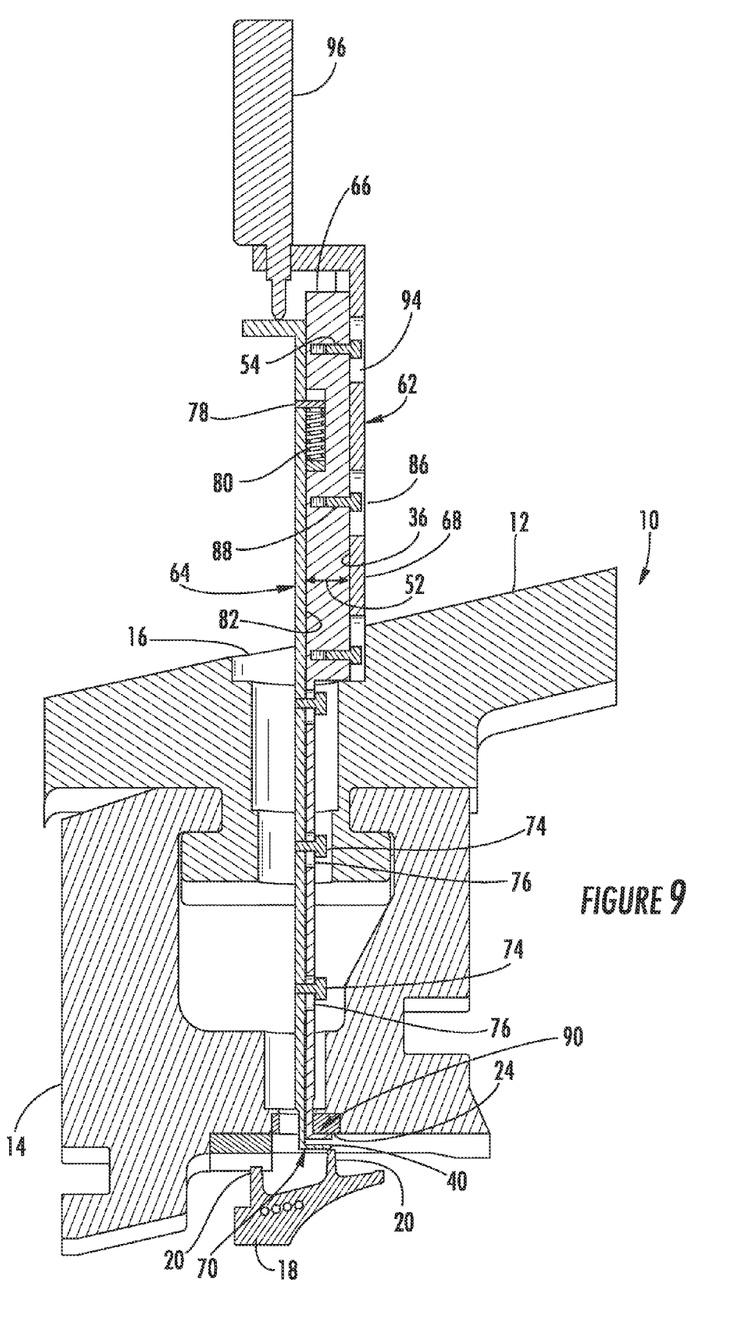
FIG. 9 is a simplified cross-section of the measuring device shown in FIGS. 7 and 8 inserted through a borehole in the turbine casing.
Figure 10:
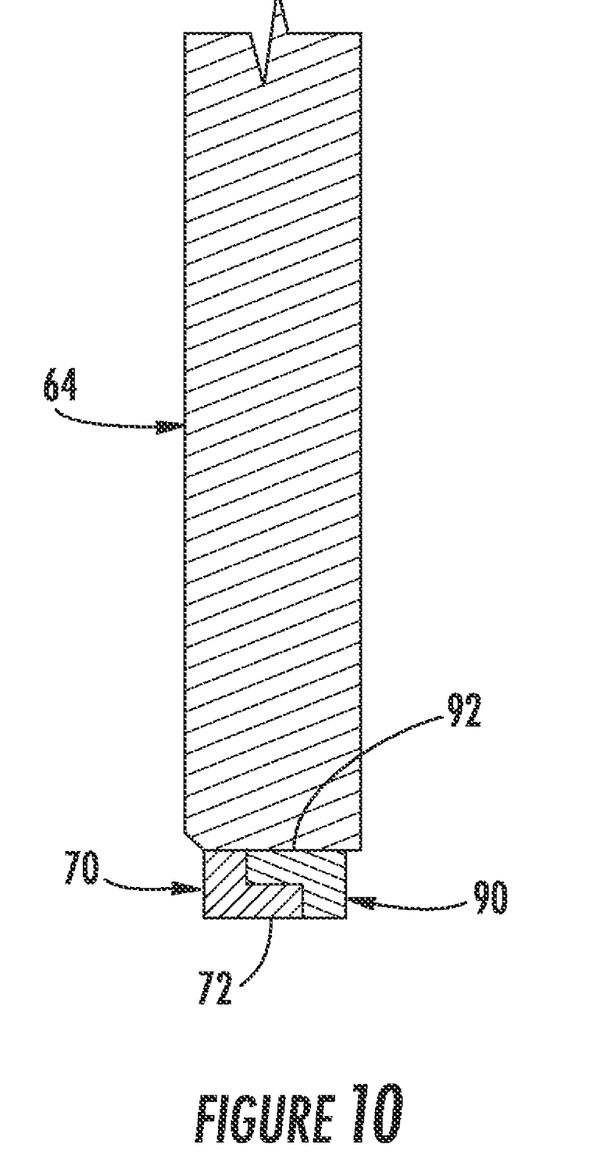
FIG. 10 is an enlarged axial cross section of the first and second members shown in FIG. 9.

FIG. 9 provides a simplified cross-section of the measuring device 60 shown in FIGS. 7 and 8 inserted through the borehole 16 in the turbine casing 10. As shown in FIG. 9, the device 60 is illustrated measuring the internal clearance 22 between the inner portion of the casing 24 and the shroud tip 20 at the outer portion of the turbine bucket 18. To do so, the first and second legs 64, 66 of the device 60 are inserted through the borehole 16 in the turbine casing 10, and the device 60 is moved rearward until the base surface 68 abuts or touches the turbine casing 10. In this position, the predetermined distance 84 between the base surface 68 and the first leg surface 82 ensures the proper positioning of at least a portion of the first distal end 70 in the clearance 22 between the inner turbine casing 24 and the shroud tip 20 at the outer portion of the turbine bucket 18. Specifically, with the base surface 68 abutting or touching the turbine casing 10, the first distal end 70 of the first leg 64 extends through the borehole 16 until it is approximately even with the inner portion of the turbine casing 24 resulting in at least a portion of the first distal end 70 being located between the inner portion of the turbine casing 24 and the shroud tip 20 at the outer portion of the turbine bucket 18. The first member 72, if present, would thus extend substantially perpendicular from the first distal end 70 along the inner surface of the turbine casing 24. Similarly, with the base surface 68 abutting or touching the turbine casing 10, the second distal end 90 of the second leg 66 extends through the borehole 16 until it is approximately even with the inner portion of the turbine casing 24. The second member 92, if present, would thus extend substantially perpendicular from the second distal end 90 along the inner surface of the turbine casing 24. If desired, the first and second members 72, 92, if present, may be nested in one another to minimize the combined height of the first and second members 72, 92, as shown for example in the axial cross section of the first and second members 72, 92 illustrated in FIG. 10.

Figure 11:
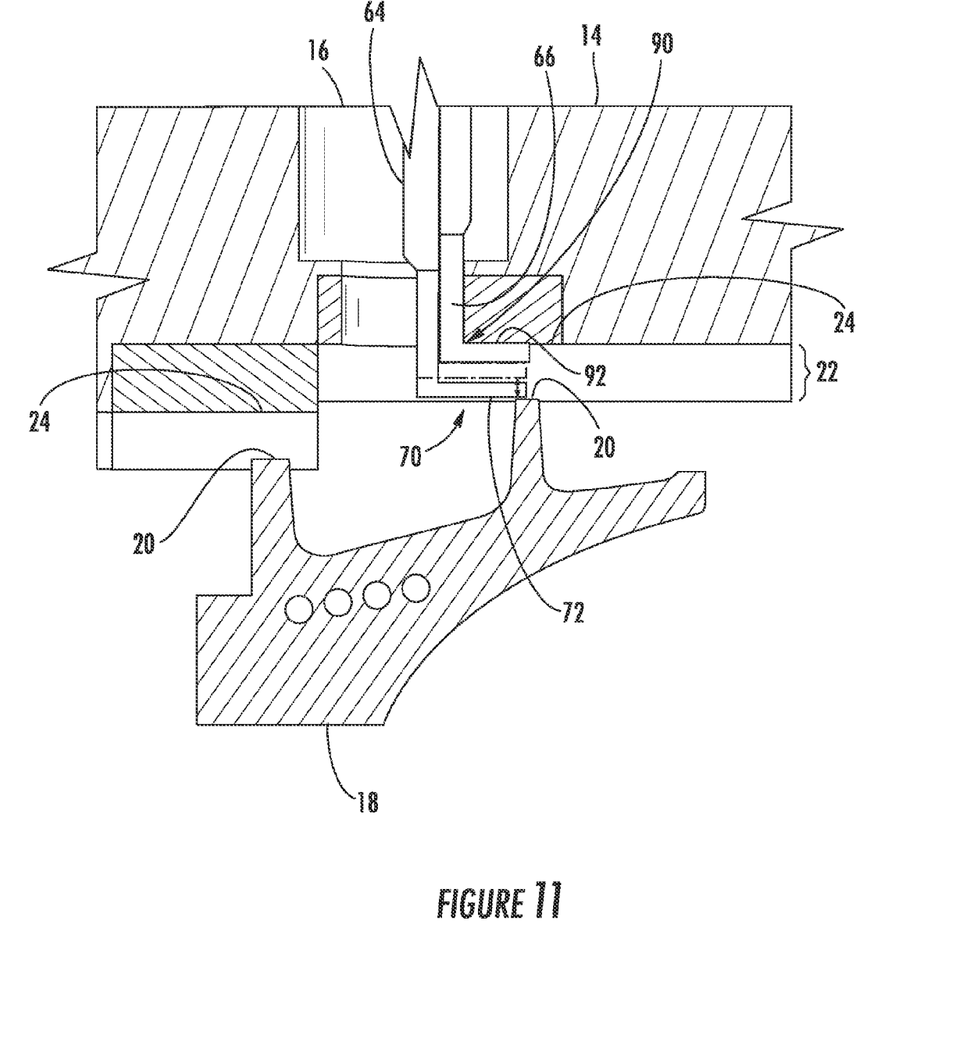
FIG. 11 is an enlarged view of the distal end of the measuring device shown in FIG. 9.

With at least a portion of the first distal end 70 of the first leg 64 between the inner portion of the turbine casing 24 and the shroud tip 20 at the outer portion of the turbine bucket 18, the clearance 22 between the inner portion of the turbine casing 24 and the shroud tip 20 at the outer portion of the turbine bucket 18 may be measured by slightly withdrawing the device 60 from the borehole 16 or alternately sliding the first and second legs 64, 66 with respect to the base 62 until the first and second distal ends 70, 90 are approximately even with the inner portion of the turbine casing 24 and at least a portion of the first distal end 70 is located between the inner portion of the turbine casing 24 and the outer portion of the turbine bucket 18. In this position, the second member 92, if present, contacts the inner portion of the turbine casing 24, as shown more clearly in FIG. 11. The first leg 64 may then be slid along and away from the base 62 until at least a portion of the first distal end 70 (e.g., the first member 72, if present) contacts the shroud tip 20, as shown more clearly in FIG. 11. An indicator 96 may be connected to the first leg 64 to measure the distance traveled by the first leg 64, and thus the clearance 22 between the inner portion of the turbine casing 24 and the shroud tip 20 at the outer portion of the turbine bucket 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A device for measuring a clearance between an inner portion of a turbine casing and an outer portion of a turbine bucket, comprising:
   a. a base, wherein said base includes a base surface;
   b. a first leg in sliding engagement with said base, wherein said first leg includes a first leg surface and a first distal end; and
   c. a predetermined distance between said base surface and said first leg surface, wherein when said base surface abuts the turbine casing, at least a portion of said first distal end of said first leg is located between the inner portion of the turbine casing and the outer portion of the turbine bucket.

2. The device as in claim 1, wherein said base surface is curved.

3. The device as in claim 1, wherein said first distal end is extendable away from said base.

4. The device as in claim 1, further including a first member extending substantially perpendicular from said first leg at said first distal end.

5. The device as in claim 1, wherein said first leg is biased toward said base.

6. The device as in claim 1, further including means for adjusting said predetermined distance between said base surface and said first leg surface.

7. The device as in claim 6, wherein said means for adjusting said predetermined distance includes a threaded engagement.

8. The device as in claim 1, further including a second leg proximate to said base and adjacent to said first leg.

9. The device as in claim 8, wherein said second leg includes a second distal end.

10. The device as in claim 8, wherein said second leg is in sliding engagement with said first leg.

11. A device for measuring a clearance between an inner portion of a turbine casing and an outer portion of a turbine bucket, comprising:
    a. a base, wherein said base includes a base surface;
    b. a first leg in sliding engagement with said base, wherein said first leg includes a first leg surface and a first distal end;
    c. a second leg proximate to said base wherein said second leg includes a second distal end; and
    d. a predetermined distance between said base surface and said first leg surface, wherein when said base surface abuts the turbine casing, at least a portion of said first distal end of said first leg is located between the inner portion of the turbine casing and the outer portion of the turbine bucket and said second distal end of said second leg is approximately even with the inner portion of the turbine casing.

12. The device as in claim 11, wherein said base surface is curved.

13. The device as in claim 11, wherein said first distal end is extendable away from said base.

14. The device as in claim 11, further including a first member extending substantially perpendicular from said first leg at said first distal end.

15. The device as in claim 11, wherein said first leg is biased toward said base.

16. The device as in claim 11, wherein said second leg is in sliding engagement with said first leg.

17. The device as in claim 11, further including means for adjusting said predetermined distance between said base surface and said first leg surface.

18. The device as in claim 17, wherein said means for adjusting said predetermined distance includes a threaded engagement.

19. A method for measuring a clearance between an inner portion of the turbine casing and an outer portion of a turbine bucket, comprising:
    a. inserting a leg of a device into a borehole in the turbine casing;
    b. moving the device rearward until the device abuts the turbine casing;

c. withdrawing the leg of the device from the borehole until at least a portion of the leg abuts the inner portion of the turbine casing;
d. extending the leg of the device inside the turbine casing until at least a portion of the leg abuts the outer portion of the turbine bucket; and
e. measuring the distance that the leg was extended after being withdrawn.

20. The method as in claim 19, further including inserting a second leg of the device into the borehole of the turbine casing so that the second leg is approximately even with the inner portion of the turbine casing.

21. A turbine clearance measuring device, comprising:
a. a turbine casing, wherein said turbine casing includes an inner portion;
b. a turbine bucket inside said turbine casing, wherein said turbine bucket includes an outer portion;
c. a base, wherein said base includes a base surface configured to abut said turbine casing;
d. a first leg in sliding engagement with said base, wherein said first leg includes a first leg surface and a first distal end; and
e. a predetermined distance between said base surface and said first leg surface, wherein when said base surface abuts said turbine casing, at least a portion of said first distal end of said first leg is located between said inner portion of said turbine casing and said outer portion of said turbine bucket.

22. The device as in claim 21, wherein said base surface is curved.

23. The device as in claim 21, wherein said first distal end is extendable away from said base.

24. The device as in claim 21, further including a first member extending substantially perpendicular from said first leg at said first distal end.

25. The device as in claim 21, wherein said first leg is biased toward said base.

26. The device as in claim 21, further including means for adjusting said predetermined distance between said base surface and said first leg surface.

27. The device as in claim 26, wherein said means for adjusting said predetermined distance includes a threaded engagement.

28. The device as in claim 21, further including a second leg proximate to said base and adjacent to said first leg.

29. The device as in claim 28, wherein said second leg includes a second distal end.

30. The device as in claim 28, wherein said second leg is in sliding engagement with said first leg.

* * * * *